United States Patent
Teraya et al.

(10) Patent No.: US 9,476,335 B2
(45) Date of Patent: Oct. 25, 2016

(54) HYBRID VEHICLE AND CONTROL METHOD THEREFOR

(71) Applicant: TOYOTA JIDOSHA KABUSHIKI KAISHA, Toyota-shi, Aichi-ken (JP)

(72) Inventors: Ryuta Teraya, Gotenba (JP); Daigo Ando, Nagoya (JP); Hidekazu Nawata, Gotenba (JP); Tatsuya Fujii, Nagakute (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/781,951

(22) PCT Filed: Mar. 28, 2014

(86) PCT No.: PCT/IB2014/000434
§ 371 (c)(1),
(2) Date: Oct. 2, 2015

(87) PCT Pub. No.: WO2014/162186
PCT Pub. Date: Oct. 9, 2014

(65) Prior Publication Data
US 2016/0052508 A1 Feb. 25, 2016

(30) Foreign Application Priority Data

Apr. 3, 2013 (JP) ................................ 2013-077484
Jan. 17, 2014 (JP) ................................ 2014-006572

(51) Int. Cl.
*B60W 20/00* (2016.01)
*F01N 3/20* (2006.01)
(Continued)

(52) U.S. Cl.
CPC ................ *F01N 3/20* (2013.01); *B60W 10/06* (2013.01); *B60W 10/08* (2013.01); *B60W 20/1082* (2013.01); *B60W 20/16* (2016.01); *B60W 2510/068* (2013.01); *B60W 2510/0676* (2013.01); *B60W 2530/12* (2013.01); *B60W 2710/065* (2013.01);
(Continued)

(58) Field of Classification Search
CPC ......................... B60W 20/16; Y10S 903/905
See application file for complete search history.

(56) References Cited

U.S. PATENT DOCUMENTS

2001/0032621 A1 10/2001 Kojima et al.
2008/0127933 A1* 6/2008 Blumberg ............... F02B 11/00
123/304

(Continued)

FOREIGN PATENT DOCUMENTS

JP 2002-130030 5/2002
JP 2006-9746 1/2006
(Continued)

*Primary Examiner* — Thomas Tarcza
*Assistant Examiner* — Alex C Dunn
(74) *Attorney, Agent, or Firm* — Finnegan, Henderson, Farabow, Garrett & Dunner, LLP

(57) ABSTRACT

A hybrid vehicle includes an engine; a motor, a catalyst used to purify exhaust gas of the engine, and an ECU configured to control the engine and the motor according to an output request of the hybrid vehicle, execute a target engine output keeping control for controlling an engine output such that the, target engine output keeps at a predetermined value during warm-up of the catalyst, and set an engine speed to a first engine speed when the target engine output keeping control is executed, the first engine speed being lower than a lower limit engine speed at which the engine is operated without executing the target engine output keeping control.

6 Claims, 8 Drawing Sheets

(51) Int. Cl.
*B60W 10/06* (2006.01)
*B60W 10/08* (2006.01)

(52) U.S. Cl.
CPC ............... *B60W 2710/0644* (2013.01); *B60W 2710/0666* (2013.01); *B60W 2710/0694* (2013.01); *B60Y 2300/474* (2013.01); *Y10S 903/905* (2013.01); *Y10S 903/93* (2013.01)

(56) References Cited

U.S. PATENT DOCUMENTS

| | | | |
|---|---|---|---|
| 2009/0048050 A1* | 2/2009 | Kamada | B60K 6/442 |
| | | | 475/150 |
| 2010/0038158 A1* | 2/2010 | Whitney | B60K 6/365 |
| | | | 180/65.265 |
| 2010/0108032 A1* | 5/2010 | Pursifull | B60W 10/06 |
| | | | 123/406.12 |
| 2010/0204864 A1 | 8/2010 | Ando et al. | |
| 2010/0251996 A1 | 10/2010 | Akimoto | |
| 2011/0270511 A1* | 11/2011 | Kurtz | F02D 29/06 |
| | | | 701/105 |
| 2013/0296136 A1* | 11/2013 | Doering | B60K 6/48 |
| | | | 477/167 |

FOREIGN PATENT DOCUMENTS

| | | |
|---|---|---|
| JP | 2012-40915 | 3/2012 |
| WO | WO 2011/108226 A1 | 9/2011 |

* cited by examiner

HYBRID VEHICLE AND CONTROL METHOD THEREFOR

CROSS-REFERENCE TO RELATED APPLICATIONS

This application is a national phase application of International Application No. PCT/IB2014/000434, filed Mar. 28, 2015, and claims the priority of Japanese Application Nos. 2013-077484, filed Apr. 3, 2013, and 2014-006572, filed Jan. 17, 2014, the content of all of which is incorporated herein by reference.

BACKGROUND OF THE INVENTION

1. Field of the Invention

The invention relates to a hybrid vehicle that includes an engine and a motor, and runs using at least one of the engine and the motor used as a drive source and a control method for the hybrid vehicle. The invention relates to a warm-up control of a catalyst for purifying exhaust gas of the engine.

2. Description of Related Art

Japanese Patent Application Publication No. 2002-130030 (JP 2002-130030 A) describes that, in the startup of an engine provided with a catalyst in an exhaust gas passage from its cold state, by setting a target rotation speed during first idling in the cold state of the engine to a higher value as the misfire rate of the engine is larger, a combustion state during the first idling in the cold state of the engine is improved, the warm-up of the catalyst is accelerated, and the amount of emission of hydrocarbon (HC) caused by the misfire of the engine is reduced.

Japanese Patent Application Publication No. 2012-40915 (JP 2012-40915 A) describes that, in a hybrid vehicle, during the warp-up of the catalyst, an engine rotation per minute (RPM) during a catalyst warm-up operation is set to the lowest RPM during normal running and moreover an output torque is set to 0 or a value slightly higher than 0. In addition, JP 2012-40915 A also describes that the ignition timing of the engine is retarded relative to the ignition timing of the engine during an efficient operation, and the catalyst warm-up is thereby accelerated.

SUMMARY OF THE INVENTION

In each of JP 2002-130030 A and JP 2012-40915 A, an idea that the engine RPM during the catalyst warm-up is set particularly to a low value is not described.

The invention provides a hybrid vehicle capable of improving fuel consumption performance in the case where the catalyst warm-up is performed by controlling an engine output such that a target engine output keeps at a predetermined value, and a control method for the hybrid vehicle.

A first aspect of the invention is a hybrid vehicle including an engine, a motor, a catalyst used to purify exhaust gas of the engine, and an electronic control unit (ECU) configured to control the engine and the motor according to an output request of the hybrid vehicle, execute a target engine output keeping control for controlling an engine output such that a target engine output keeps at a predetermined value during warm-up of the catalyst, and set an engine speed to a first engine speed when the engine output control is executed, the first engine speed being lower than a lower limit engine speed at which the engine is operated without executing the target engine output keeping control. With the above aspect, it is possible to cause an operation point of the engine to approach an operation area having excellent fuel efficiency in the case where catalyst warm-up is performed by controlling the engine output such that the target engine output keeps at a predetermined value, and it is possible to improve fuel consumption performance during the catalyst warm-up.

In addition, in the above aspect, an ignition retard angle control in which an ignition timing of the engine is retarded by a specific angle may be executed when a temperature of a cooling water of the engine is less than a first specific temperature and the temperature of the catalyst is less than a second specific temperature, and the target engine output keeping control may be executed when the temperature of the catalyst is not less than the second specific temperature and not more than a third specific temperature, the third specific temperature being higher than the second specific temperature.

Further, in the above aspect, the ECU may set a lower limit engine speed when the engine is operated to a second engine speed, the second engine speed being higher than the first engine speed, when the temperature of the cooling water of the engine is less than the first specific temperature and the temperature of the catalyst is more than the third specific temperature. Furthermore, in the above aspect, the second engine speed may be an idling speed during a cold state of the engine.

A second aspect of the invention is a control method for a hybrid vehicle including an engine, a motor, an ECU, and a catalyst used to purify exhaust gas of the engine, the control method including (i) controlling, by the electronic control unit, the engine and the motor according to an output request of the hybrid vehicle, (ii) executing, by the electronic control unit, a target engine output keeping control for controlling an engine output such that a target engine output keeps at a predetermined value during warm-up of the catalyst, and (iii) setting, by the electronic control unit, an engine speed to a first engine speed when the target engine output keeping control is executed, the first engine speed being lower than a lower limit engine speed at which the engine is operated without executing the target engine output keeping control. In the above aspect, an ignition retard angle control in which an ignition timing of the engine is retarded by a specific angle may be executed by the electronic control unit when the temperature of a cooling water of the engine is less than a first specific temperature and a temperature of the catalyst is less than a second specific temperature, and the target engine output keeping control may be executed by the electronic control unit when the temperature of the catalyst is not less than the second specific temperature and not more than a third specific temperature, the third specific temperature being higher than the second specific temperature.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
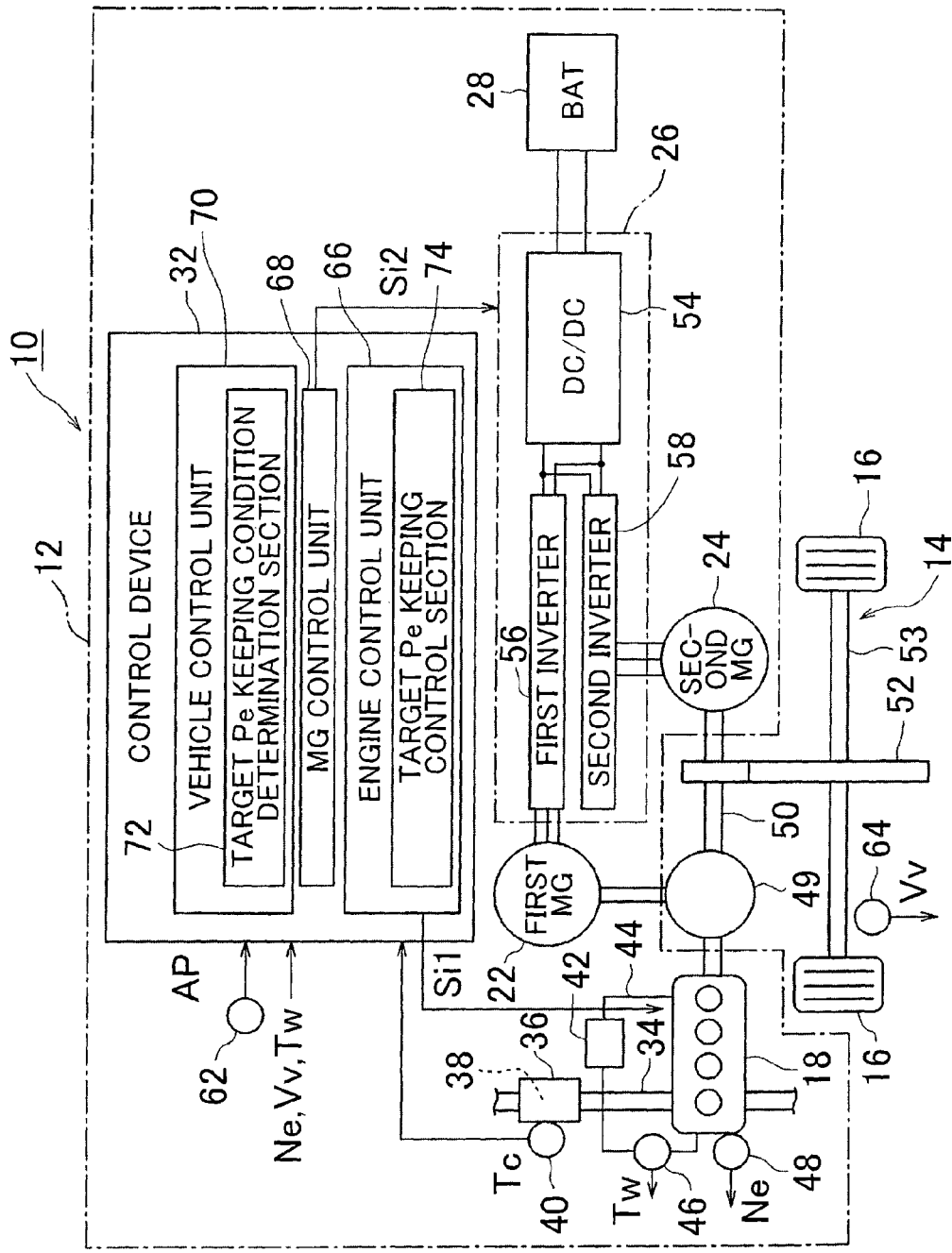
FIG. 1 is a configuration diagram of a hybrid vehicle on which a control system of an embodiment of the invention is mounted.

Hereinbelow, an embodiment of the invention will be described by using the drawings. In the following description, the same elements are provided with the same reference numerals in all of the drawings.

FIG. 1 shows a schematic configuration of a hybrid vehicle 10 on which a control system 12 of the embodiment of the invention is mounted. The control system 12 includes an engine 18, a first motor generator 22 as a generator driven by the engine 18, a second motor generator 24 as a motor, a power control unit (PCU) 26, a battery 28 as a power storage unit, and a control device 32. In the following description, the first motor generator 22 is referred to as "the first MG 22", and the second motor generator 24 is referred to as "the second MG 24".

The hybrid vehicle 10 can be applied to a front engine/front drive (FF) vehicle as a front-engine front-drive vehicle, a front engine/rear drive (FR) vehicle as a front-engine rear-drive vehicle, or a four wheel drive (4 WD) vehicle.

The engine 18 is a gasoline engine or a diesel engine. The engine 18 is controlled with a control signal Si1 from the control device 32. The engine 18 includes an exhaust gas control apparatus 36 provided in an exhaust gas passage 34. The exhaust gas control apparatus 36 has a catalyst 38 called a three-way catalyst for removing carbon monoxide (CO), HC, and nitrogen oxides (NOx) as pollutants contained in exhaust gas discharged into the exhaust gas passage 34. A catalyst temperature sensor 40 is attached to the exhaust gas control apparatus 36 to detect a catalyst temperature Tc, and a signal indicative of the detected value of the catalyst temperature Tc is transmitted to the control device 32. Note that, as the catalyst 38, it is possible to use a catalyst that controls any one or two of CO, HC, and NOx. In this case, an exhaust gas control apparatus having a catalyst that controls the remaining pollutants is attached to another portion of the exhaust gas passage 34.

The engine 18 is cooled by a cooling water that circulates in a coolant flow path 44 while passing through a radiator 42. A water temperature sensor 46 detects an engine cooling water temperature Tw as the temperature of the cooling water of the engine 18, and a signal indicative of the detected value of the engine cooling water temperature Tw is transmitted to the control device 32. An engine speed (e.g., RPM) sensor 48 detects an RPM Ne of a crankshaft of the engine 18, and a signal indicative of the detected value of the RPM Ne is transmitted to the control device 32.

The first MG 22 is a three-phase synchronous generator that is driven mainly by the engine 18 to generate electric power. In this case, at least a part of a torque from the engine 18 is transmitted to a rotating shaft of the first MG 22 via a power dividing mechanism 49 described later. Electric power generated in the first MG 22 is supplied to the battery 28 via the PCU 26, and the battery 28 is thereby charged. An RPM Vm1 of the first MG 22 is detected by a first rotation sensor (not shown), and the detected value thereof is transmitted to the control device 32. The first MG 22 is used also as a motor for starting the engine 18.

The second MG 24 is a three-phase synchronous motor that is driven with electric power supplied mainly from the battery 28 to generate the driving force of the vehicle. The second MG 24 is used also as the generator, i.e., for electric power regeneration. Electric power generated in the second MG 24 is also supplied to the battery 28 via the PCU 26, and the battery 28 is thereby charged. An RPM Vm2 of the second MG 24 is detected by a second rotation sensor (not shown), and the detected value thereof is transmitted to the control device 32. Note that, as the first MG 22 and the second MG 24, an induction motor or other electric motors may also be used.

A power transmission mechanism 14 includes the power dividing mechanism 49, an output shaft 50 coupled to the power dividing mechanism 49, a reduction gear 52 coupled to the output shaft 50, and an axle 53. The power dividing mechanism 49 is configured by a planetary gear mechanism. The planetary gear mechanism includes a sun gear, a pinion gear, a carrier, and a ring gear. For example, the sun gear is connected to an end portion of the hollow rotating shaft of the first MG 22. The carrier is connected to a drive shaft of the engine 18. The ring gear is connected to the output shaft 50. The output shaft 50 is connected to a rotating shaft of the second MG 24 directly or via a gear reducer (not shown). The output shaft 50 is connected to the axle 53 coupled to wheels 16 via the reduction gear 52. The power dividing mechanism 49 divides power from the engine 18 into a portion to a path to the output shaft 50 and a portion to a path to the first MG 22.

The PCU 26 is connected between the first MG 22, the second MG 24, and the battery 28. The PCU 26 includes a direct-current-to-direct-current (DC/DC) converter 54, a first inverter 56, and a second inverter 58, and is controlled with a control signal Si2 from the control device 32. The DC/DC converter 54 is a voltage conversion unit including two switching elements connected in series, two diodes that are connected in parallel to the switching elements and flow a reverse current, and a reactor that has one end connected between the switching elements. As the switching element, an insulated gate bipolar transistor (IGBT) or a transistor can be used. The DC/DC converter 54 boosts a DC voltage supplied from the battery 28 and supplies the boosted DC voltage to each of the inverters 56 and 58. The DC/DC converter 54 also has the function of lowering the DC voltage supplied from at least one of the inverters 56 and 58, and supplies DC electric power to the battery 28 to charge the battery 28.

In the case where the first MG 22 generates electric power with the drive of the engine 18, the first inverter 56 converts an alternating current (AC) voltage obtained by the electric power generation to a DC voltage, and supplies the DC voltage obtained by the conversion to the DC/DC converter 54. In addition, the first inverter 56 also has the function of converting the DC voltage supplied from the DC/DC converter 54 to the AC voltage, and supplying the AC voltage to the first MG 22 to drive the first MG 22.

The second inverter 58 converts the DC voltage supplied from the DC/DC converter 54 to the AC voltage, and supplies the AC voltage to the second MG 24 to drive the second MG 24. The second inverter 58 also has the function of converting the AC voltage generated by the second MG 24 to the DC voltage during regenerative braking of the hybrid vehicle 10, and supplying the DC voltage obtained by the conversion to the DC/DC converter 54.

Each of the first inverter 56 and the second inverter 58 includes switching elements of three phases, and switching of each switching element is controlled with the control signal Si2 from the control device 32. It is also possible to omit the DC/DC converter 54 in the PCU 26.

The battery 28 is a power storage unit, and is configured by a nickel-metal hydride battery or a lithium ion battery. The power storage unit can also be configured by a capacitor.

An accelerator position sensor 62 detects an accelerator position AP of an accelerator pedal, and a signal indicative of the accelerator position AP is transmitted to the control device 32. A wheel speed sensor 64 detects an RPM Vv of the wheel 16, and a signal indicative of the RPM Vv is transmitted to the control device 32. The control device 32 calculates a vehicle speed based on the RPM Vv. The control device 32 may also calculate the vehicle speed based on the RPM Vm2 of the second MG 24 as the detected value of the second rotation sensor.

The control device 32 is what is called an ECU, and includes a microcomputer having a central processing unit (CPU) and a memory. In an example shown in the drawing, the control device 32 is illustrated as one control device 32, but a configuration may also be adopted in which the control device 32 is divided into a plurality of elements appropriately, and the elements are connected to each other with a signal cable. The control device 32 has an engine control unit 66 that controls the engine 18, an MG control unit 68 that controls the first MG 22 and the second MG 24 via the PCU 26, and a vehicle control unit 70 that controls the engine control unit 66 and the MG control unit 68. With "Pe" indicative of the engine output used in the following description, the vehicle control unit 70 has a target Pe keeping condition determination section 72, the engine control unit 66 has a target Pe keeping control section 74, and these two sections will be described in detail later.

The engine control unit 66 generates the control signal Si1 outputted to the engine 18, and the MG control unit 68 generates the control signal Si2 outputted to the PCU 26.

The control device 32 controls the drive of each of the engine 18, the first MG 22, and, the second MG 24 according to an output request of the vehicle. In this case, a normal running control during the warm state of the engine in which the temperature of the engine 18 is sufficiently high is executed in the following manner. First, the vehicle control unit 70 calculates a target running torque Tr* as the output request to the output shaft 50 connected to the ring gear and a target engine output Pe*. The target running torque Tr* is calculated based on the accelerator position AP. It may also be calculated from the vehicle speed and the accelerator position AP. The target engine output Pe* is calculated from the vehicle speed or the RPM of the output shaft 50 obtained from the RPM Vm2 of the second MG, and the target running torque Tr*.

Figure 3:
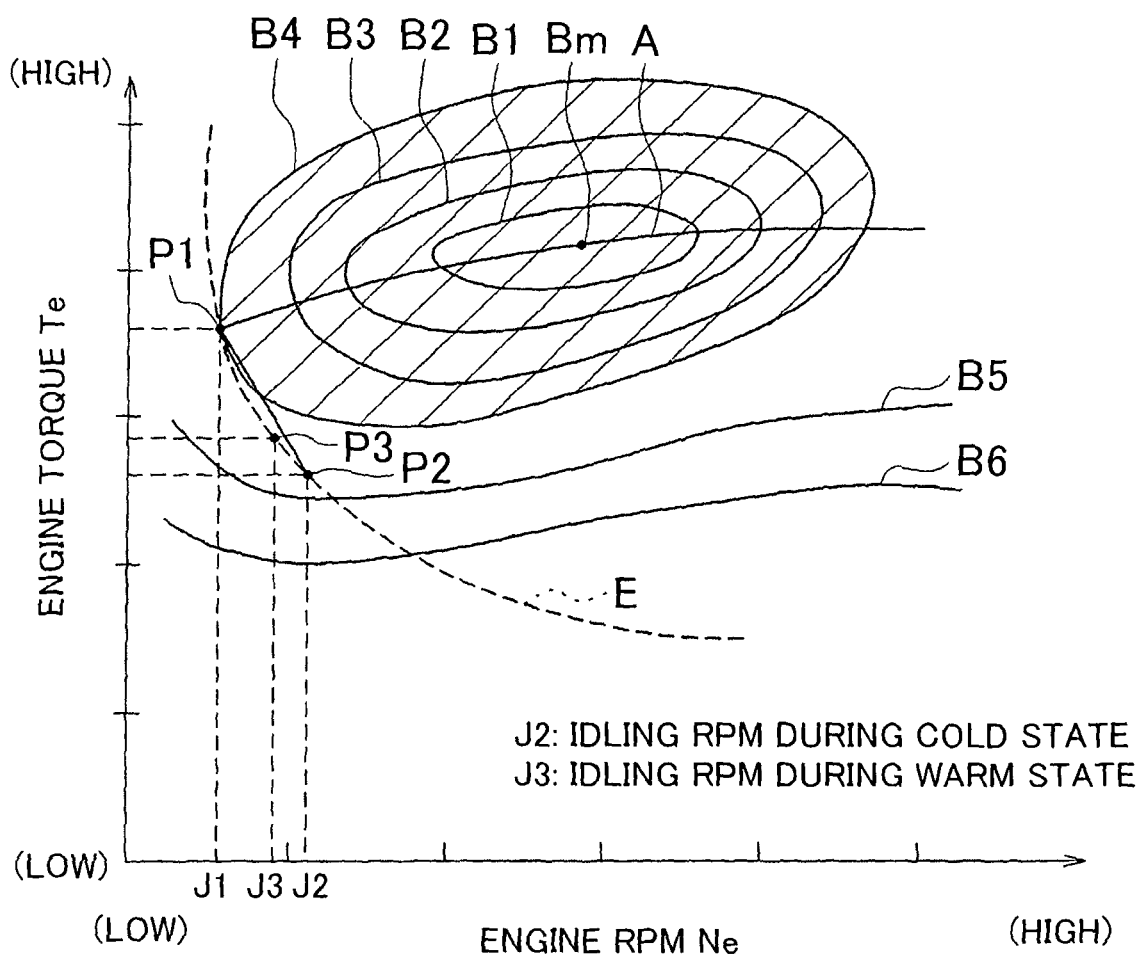
FIG. 3 is a view showing the relationship between an operation point of the engine and a high fuel efficiency area during a target engine output keeping control in the control system of FIG. 1.

The vehicle control unit 70 calculates a target RPM Ne* and a target torque Te* of the engine 18 based on the target engine output Pe* from a pre-set engine high efficiency map. For example, as shown in FIG. 3 described later, in the case where a fuel consumption rate map is used as the engine high efficiency map, the fuel consumption rate is indicated by a thick line A. The vehicle control unit 70 can move an operation point of the engine 18 on a fuel consumption optimum operation line obtained by joining points that enhance fuel consumption performance with the same RPM. Curves B1, B2, . . . B6 shown in FIG. 3 represent contour lines of the fuel efficiency of the engine 18, the fuel efficiency is highest inside B1, and a point Bm is a point at which the fuel efficiency is highest inside B1.

The vehicle control unit 70 calculates a target RPM Vm1* of the first MG 22 from the target RPM Ne* of the engine 18 and the detected value of the RPM Vm2 of the second MG 24 by using a dynamic relational expression of the elements of the power dividing mechanism 49. Subsequently, the vehicle control unit 70 calculates a target torque Tr1* of the first MG 22 from the target RPM Vm1* and the detected value of the Vm1 of the first MG 22 by using a relational expression in a feedback control of the target RPM Vm1*. Further, the vehicle control unit 70 calculates a target torque Tr2* of the second MG 24 from the target running torque Tr* and the target torque Tr1* of the first MG 22. The target RPM Ne* and the target torque Te* of the engine 18, the target RPM Vm1* and the target torque tr1* of the first MG 22, and the target torque Tr2* of the second MG 24 described above may also be calculated from a map pre-stored in a storage unit (not shown) based on the accelerator position AP or the accelerator position AP and the vehicle speed.

The vehicle control unit 70 outputs the calculated target RPM Ne* and target torque Te* of the engine 18 to the engine control unit 66, and the engine control unit 66 controls the drive of the engine 18 with the control signal Si1 such that the target RPM Ne* and the target torque Te* are obtained. In addition, the vehicle control unit 70 outputs the calculated target RPM Vm1* and target torque Tr1* of the first MG 22 and the calculated target torque Tr2* of the second MG 24 to the MG control unit 68, and the MG control unit 68 controls the drive of each of the first MG 22 and the second MG 24 with the control signal Si2 such that the target RPM Vm1* and the target torques Tr1* and Tr2* are obtained. Note that, in the drive control described above, the MG control unit 68 calculates a charge-discharge demand of the battery 28 by using the calculated value of a state of charge (SOC) as a battery charge amount calculated from the detected value of one or both of a battery current and a battery voltage. Subsequently, the MG control unit 68 can determine the target RPM and the target torque of the first MG 22 and the second MG 24 such that the charge-discharge demand is satisfied.

In addition, the control device 32 also has a warm-up control function of controlling the RPM of the engine 18 such that the catalyst 38 and the engine 18 are warmed up immediately after the startup of the engine. In this case, the control device 32 executes "a catalyst warm-up control" for setting the catalyst temperature Tc to a temperature not less than a specific catalyst temperature such that the catalyst 38 can achieve desired performance. Thereafter, in order to set the engine cooling water temperature Tw to a temperature not less than a specific temperature TA such that the engine 18 can achieve desired performance, the control device 32 executes "an engine warm-up control" that uses the catalyst having a high temperature.

With regard to the catalyst warm-up control, the target Pe condition determination section 72 of the vehicle control unit 70 determines whether or not "a specific condition" pre-set for performing the target Pe keeping control (e.g., a target engine output keeping control) is satisfied. In the embodiment, the above-described "specific condition" is satisfied when the detected value of the temperature of the cooling water of the engine 18 (the engine cooling water temperature Tw) is a temperature that requires the warm-up of the engine (less than the specific temperature TA), and the detected value of the temperature of the catalyst 38 is in a specific catalyst temperature range Trg that allows execution of the target Pe keeping control. For example, the "specific condition" is satisfied in the case where the catalyst temperature Tc is not less than a first specific temperature T1 and not more than a second specific temperature T2 (T1≤Tc≤T2). In this case, the lower limit value of the specific catalyst temperature range Trg is T1, and the upper limit value thereof is T2. In the case where such a specific condition is satisfied, the vehicle control unit 70 determines that the catalyst warm-up request with the target Pe keeping control, and the target Pe keeping control section 74 of the engine control unit 66 controls the engine output such that the target engine output Pe* keeps at predetermined value. The target engine output keeping control is an example in which the engine output is controlled such that the target engine output Pe* keeps at a predetermined value. Note that, as will be described later, the temperature of the catalyst 38 can be determined as the estimated value. In this case, the above-described specific condition is satisfied when the detected value of the water temperature is less than the specific temperature and the estimated value of the catalyst temperature is in the specific catalyst temperature range Trg.

The temperature of the catalyst 38 determines the purification performance of the catalyst 38 and also determines the amount of exhaust gas that can be purified, and hence a first reason for performing the target Pe control is to increase the temperature of the catalyst 38 quickly while suppressing the emission of pollutants by setting the target engine output Pe* corresponding to the vicinity of the upper limit of the amount of the exhaust gas by the vehicle control unit 70. A second reason therefor is to stabilize an air-fuel ratio (A/F) by controlling the engine output such that the predetermined target engine output keeps at a predetermined value by the target Pe keeping control section 74 to thereby improve fuel consumption while suppressing the emission of pollutants from the exhaust gas passage 34 to the outside.

Note that, during the target Pe keeping control, in the case where the requested output during running becomes larger than the target engine output Pe*, the vehicle control unit 70 controls the first MG 22 and the second MG 24 such that the second MG 24 or the first MG 22 and the second MG 24 generate the shortfall of the output. In addition, during the stop of the vehicle, the vehicle control unit 70 drives the first MG 22 while adjusting electric power generated in the first MG 22 such that the target engine output Pe* is consumed by the first MG 22.

In addition, in the case where the above-described "specific condition" is not satisfied when the catalyst warm-up control is performed, e.g., in the case where the catalyst temperature Tc is less than the first specific temperature T1, as an initial catalyst warm-up control before the target Pe keeping control, an ignition retard angle control for retarding the ignition timing of the engine 18 is executed. In the ignition retard angle control, the ignition timing of the engine 18 is retarded relative to a pre-set normal set timing by a specific angle. By this ignition retard angle, the engine output is lowered, the exhaust gas temperature is increased, and the catalyst temperature Tc is also increased. Therefore, it is possible to set the catalyst temperature Tc to a temperature not less than the lower limit of the specific catalyst temperature range Trg estimated in the target Pe keeping control, e.g., not less than the first specific temperature T1. In the case where the detected value of the catalyst temperature Tc is less than the lower limit of the specific catalyst temperature range Trg, e.g., in the case where the catalyst temperature Tc is less than the first specific temperature T1, the control device 32 executes the ignition retard angle control. The target Pe keeping control is executed in the case where the ignition retard angle control is executed and the above-described specific condition is satisfied, e.g., in the case where the detected value of the catalyst temperature Tc becomes not less than the lower limit of the specific catalyst temperature range Trg. Note that the target Pe keeping control may also be executed in the case where the ignition retard angle control is executed.

In addition, the control device 32 keeps the engine speed Ne during the target Pe keeping control at a first engine RPM J1 that is lower than the lower limit engine RPM as the lower limit value of the engine RPM in the case where the engine 18 is operated without executing the target Pe keeping control. With this, it is possible to improve fuel consumption performance in the case where the catalyst warm-up is performed using the target Pe keeping control. The reason for this will be described later in detail.

Further, in the case where the detected value of the water temperature is less than the specific temperature that requires the warm-up of the engine, and the detected value of the temperature of the catalyst 38 is more than the upper limit of the specific catalyst temperature range Trg, e.g., in the case where the detected value of the temperature of the catalyst 38 is, more than the second specific temperature T2, the control device 32 sets the lower limit engine RPM in the case where the engine 18 is operated to a second engine RPM J2 higher than the first engine RPM J1 (J2>J1), and executes the engine warm-up control. That is, when the catalyst temperature is more than T2, at least the exhaust gas can be sufficiently purified even when the engine RPM is set to the second engine RPM J2, and hence the catalyst warm-up using the target Pe keeping control is ended and the engine warm-up is performed. In this engine warm-up control, by setting the second engine RPM J2 to a value higher than the lower limit engine RPM in a normal engine control described later, the warm-up control of the engine 18 after the end of the catalyst warm-up is performed. In this case, the second engine RPM J2 corresponds to an idling RPM during idling in the cold state of the engine with no load.

In the case where the detected value of the temperature of the cooling water of the engine 18 is increased to a temperature not less than the specific temperature by the execution of the engine warm-up control, the lower limit engine RPM in the case where the engine 18 is operated is set to a third engine RPM J3, and the normal engine control that Uses the engine 18 having a high temperature is executed. In this case, the third engine RPM J3 is set to be higher than the first engine RPM J1 and lower than the second engine RPM J2 as the lower limit engine RPM during the engine warm-up control (J1<J3<J2). In this case, the third engine RPM J3 corresponds to the idling RPM during the idling in the warm state of the engine with no load. The idling RPM during the warm state of the engine is lower than the idling RPM during the cold state of the engine. This is because the combustion in the engine 18 is stabilized, during the warm state of the engine so that it is possible to lower the engine RPM Ne while the combustion in the engine 18 is unstable during the cold state of the engine and an intake air amount is reduced at the time of no load so that it is necessary to increase the engine RPM Ne to stabilize the combustion in the engine 18.

Next, by using a flowchart of FIG. 2, the warm-up control of each of the catalyst 38 and the engine 18 performed immediately after the startup of the engine 18 will be described. As indicated in step S10 (hereinafter step S is simply referred to as S) of FIG. 2, the vehicle control unit 70 determines whether or not the detected value of the cooling water temperature Tw of the engine 18 is less than the specific temperature TA immediately after the startup of the engine 18. The specific temperature TA is a temperature at which the combustion in the engine 18 is stabilized, and is a temperature at which the engine warm-up is ended. When the engine 18 is started and the determination in S10 is affirmative, the vehicle control unit 70 sets the RPM of the engine 18 to the second engine RPM J2 as the idling RPM during the cold state of the engine (first engine startup). Next, the vehicle control unit 70 determines whether or not a catalyst warm-up execution condition is satisfied (S12). The catalyst warm-up execution condition is satisfied in the case where the determination in S10 is affirmative, i.e., the engine cooling water temperature Tw is less than the specific temperature TA, and the catalyst temperature Tc is less than the pre-set first specific temperature T1. The first specific temperature T1 is a temperature at which activation of a front end as the upstream side of the exhaust gas of the catalyst 38 is started, and is the lower limit value of the specific catalyst temperature range Trg. "The first engine startup" means the first engine startup (engine cold start) after the activation of the vehicle system by turning ON a start switch or an ignition key (not shown) by a user. Accordingly, the first engine startup does not include an idling stop.

In the case where the catalyst warm-up execution condition is satisfied, while the engine RPM is held at the second engine RPM J2 at the time of the startup, the vehicle control unit 70 executes the initial catalyst warm-up control via the engine control unit 66, and the engine control unit 66 causes the engine 18 to execute the ignition retard angle (S16). The exhaust gas temperature is increased by the ignition retard angle, and the catalyst temperature Tc is also increased. Subsequently in S18, it is determined whether or not the detected value of the catalyst temperature Tc is more than the first specific temperature T1 and, in the case where the determination in S18 is affirmative, the ignition retard angle is ended (S20), and the processing moves to S22. In the case where the determination in S18 is negative, the processing returns to S16, and the ignition retard angle control is continued.

In the initial state of the catalyst warm-up control, although the engine 18 is operated in a state in which the target output of the engine 18 is significantly lower than the target output Pe during the target Pe keeping control, the exhaust gas temperature is increased by performing the ignition retard angle as compared with the case where the ignition retard angle is not performed, and it is possible to increase the catalyst temperature.

In S22, it is determined whether or not the catalyst temperature Tc is not more than the second specific temperature T2. The second specific temperature T2 is a temperature at which the entire catalyst 38 is activated, and is the upper limit value of the specific catalyst temperature range Trg. In the case where the determination in S22 is affirmative, it is determined that the warm-up of the catalyst is further required, the processing moves to S24, and the target Pe keeping control is executed. In the target Pe keeping control, the target engine output Pe* is kept, at the predetermined target output Pc (S24), the engine RPM Ne is reduced from the second engine RPM J2 as the idling RPM during the cold state of the engine at the beginning of the engine startup to the first engine RPM J1 (S26), and the processing returns to S22. Thereafter, the engine RPM is kept at the first engine RPM J1 until the catalyst temperature is increased to the second specific temperature T2, and the engine output is controlled to be kept at the predetermined target output Pc. With this, the engine 18 rotates at the first engine RPM 31 lower than the second engine RPM J2 as the idling RPM at the time of the cold start of the engine, but the output thereof is controlled to be kept at the predetermined target output Pc, and hence it is possible to maintain stable rotation even in a low RPM. Such a control is continued until the catalyst temperature exceeds T2 in S22.

As described above, the RPM of the engine 18 in the target Pe keeping control is set to the first engine RPM J1 lower than the second engine RPM J2 as the idling RPM during the cold state of the engine. Conventionally, as the first engine RPM J1, in order to secure stable operation of the engine, the idling RPM as the lowest RPM in the engine operation (the idling RPM J2 during the cold state of the engine in the case of the cold start of the engine and the idling RPM J3 during the warm state of the engine in the case of the warm start of the engine) or the RPM higher than the idling RPM has been adopted. On the other hand, when consideration is given to the target Pe keeping control, an output load is at a certain level and the target Pe is predetermined target. With this condition, stable rotation is allowed even when the RPM of the engine 18 is lower than the normal idling RPM (J2, J3). That is, the target Pe keeping control is a control in which the target Pe is predetermined target (predetermined target output Pc) and a fluctuation in output is not considered so that it is only necessary to consider the stable operation of the engine 18 without considering a fluctuation in the load of the engine, and it is possible to reduce the RPM. Herein, as will be described later, the RPM of the engine 18 in the case where a specific output torque (output energy) is obtained has the optimum point of fuel consumption. In the target Pe keeping control, as the RPM of the engine 18 is lower, the fuel consumption is more improved. Accordingly, in the embodiment, the RPM of the engine 18 in the target Pe keeping control is set to the lowest RPM in a range that allows stabilization of the combustion, or a value close to the lowest RPM in the range. For example, by setting the RPM to the optimum point of the fuel consumption or a value close to the optimum point thereof, an improvement in fuel consumption in the target Pe keeping control of the catalyst warm-up is achieved. Note that the first MG 22 can be used as the load in the target Pe keeping control and the first MG 22 can generate electric power, and hence, while performing efficient electric power generation, it is possible to perform the catalyst warm-up by using heat generated in the electric power generation. In addition, in the target Pe keeping control, fuel supply corresponding to the engine output Pe is performed, and hence it is possible to increase the exhaust gas temperature to a level higher than that in the initial catalyst warm-up control.

Figure 2:
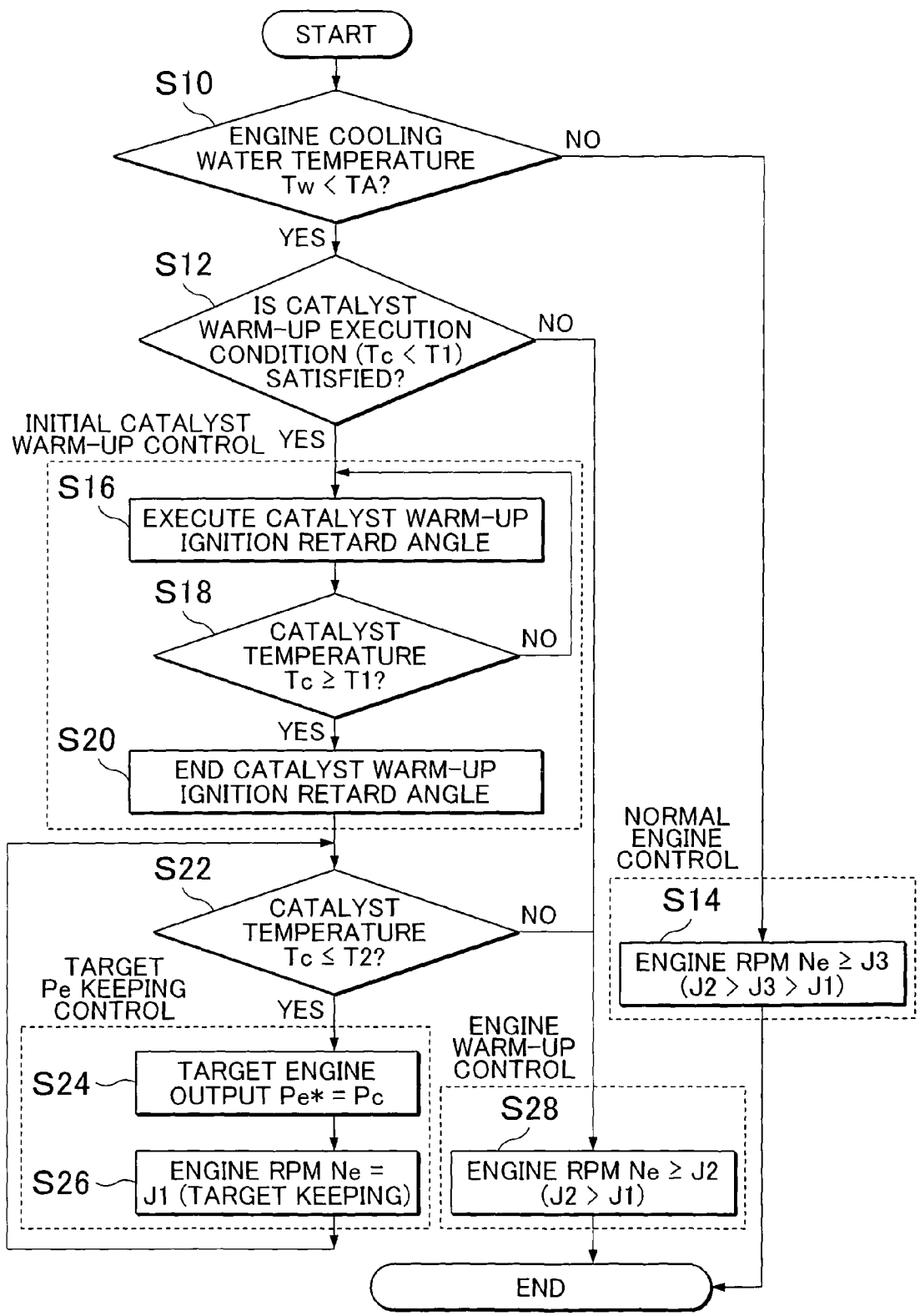
FIG. 2 is a flowchart showing a warp-up control method that performs warm-up of a catalyst and an engine in the control system of FIG. 1.

In the case where the determination in S12 of FIG. 2 is negative, i.e., in the case where the engine cooling water temperature Tw is less than the specific temperature TA and the catalyst temperature is more than the first specific temperature T1, the vehicle control unit 70 determines that the warm-up of the engine 18 is necessary but the catalyst warm-up operation is not necessary, the processing moves to S28 of FIG. 2, and the vehicle control unit 70 sets the RPM of the engine 18 to the second engine RPM J2 as the normal idling RPM during the cold state of the engine and performs the warm-up of the engine 18. In addition, in the case where the determination in S22 shown in FIG. 2 is negative, i.e., in the case where the temperature of the catalyst is increased to the second specific temperature T2 after the catalyst warm-up, the vehicle control unit 70 determines that the catalyst warm-up is ended, the processing moves to S28 of FIG. 2, and the vehicle control unit 70 changes the RPM of the engine 18 from the first engine RPM J1 back to the second engine RPM J2 as the idling RPM during the cold state of the engine and continues the normal engine warm-up. Further, in the case where the determination in S10 is negative, i.e., in the case where the engine cooling water temperature Tw is more than the specific temperature TA, the vehicle control unit 70 determines that the warm-up of the engine 18 and the warm-up of the catalyst is not necessary, sets the lower limit RPM of the engine 18 to the third engine RPM J3 as the idling RPM during the warm state of the engine (the RPM higher than the first engine RPM J1 in the case of the target Pe keeping control and lower than the second engine RPM J2 as the idling RPM during the cold state of the engine), and executes the normal engine control (S14).

According to the control system 12 configured in the manner described above, it is possible to cause the operation point of the engine 18 in the case where the catalyst warm-up is performed using the target Pe keeping control to approach the operation area having excellent fuel efficiency, and improve the fuel consumption performance during the catalyst warm-up. In addition, in spite of a condition unfavorable in terms of combustion stability that the engine RPM is the first engine RPM J1 lower than the lower limit RPM when the target Pe keeping control is not performed during the cold operation in which the cooling water temperature Tw is low, since the operation is based on the predetermined target engine output, the A/F is stabilized and the combustion in the engine 18 is also stabilized. Further, since the specific target output Pe is outputted and the engine RPM is predetermined target RPM, it is possible to reduce the deterioration of noise/vibration (NV) performance as characteristics of vibrations and noises and misfire detectability. In addition, since the target engine output is kept during the Pe keeping control, no-load idling is not performed, and the RPM of the engine 18 is not fluctuated. Thus, since the output is predetermined target output (predetermined target Pc) and the RPM is predetermined target RPM (the first engine RPM J1) in the target Pe keeping control, even when the RPM Ne is set to a value lower than the lowest engine RPM during the operation (the idling RPM J2 during the cold state of the engine, the idling RPM J3 during the warm state of the engine), the stable operation is allowed. In the embodiment, in the target Pe keeping control, it becomes possible to cause the fuel consumption in the target Pe keeping control to approach the best fuel consumption by setting the engine RPM to a value lower than the lowest RPM in other operations. That is, it is possible to improve the fuel consumption by setting the first engine RPM J1 to a value lower than the lower limit RPM when the target Pe keeping control is not performed.

FIG. 3 shows the relationship between the operation point of the engine 18 and the high fuel efficiency area during the target Pe keeping control with respect to the control system 12. In FIG. 3, the operation point during the target Pe keeping control of the embodiment is indicated by P1. In this case, the engine RPM during the target Pe keeping control is set to the first engine RPM J1, and is thereby made lower than the second engine RPM J2 as the lower limit RPM during the engine warm-up control. With this, it is possible to set the target torque Te of the engine 18 to a high value in a state in which the desired engine output Pe set from the vicinity of the upper limit of the amount of the exhaust gas that can be purified in the estimated catalyst temperature range is secured. Such an operation point P1 is close to a hatched portion of FIG. 3 as the operation area having excellent fuel efficiency, and the engine torque which is set to be the high value at this point can be absorbed by a generator of the first MG 22.

Herein, as is clear from FIG. 3, the first engine RPM J1 during the target Pe keeping control is lower than the third engine RPM J3 as the idling RPM during the warm state of the engine. During the cold state of the engine, the third engine RPM J3 is not used but, by setting the first engine RPM J1 to the RPM lower than the third engine RPM J3, it is possible to significantly improve fuel consumption during the target Pe keeping control.

P2 of FIG. 3 shows a comparative example in which the engine output Pe during the target Pe keeping control is set to the same engine output as the engine output of the embodiment, and the engine RPM Ne is set so as to match the second engine RPM J2 as the lower limit RPM during the engine warm-up control (the idling RPM during the cold state of the engine). That is, the second engine RPM J2 is the lowest engine RPM that maintains stable operation during the cold state of the engine and, since the second engine RPM J2 is normally used as the RPM during the target Pe keeping control, this is shown as the comparative example. In FIG. 3, a broken line E indicates an engine output predetermined target curve, and both of the first and second engine RPMs J1 and J2 are on the broken line E. Thus, the operation point P2 in the comparative example is away from the hatched portion of FIG. 3 as the operation area having excellent fuel efficiency and the fuel consumption optimum line A so that there is a possibility that the fuel consumption performance is lowered, but the embodiment can improve this. A case where, in FIG. 3, the operation point during the target Pe keeping control is a point P3 at which the engine RPM corresponds to the third engine RPM J3 that is equal to the idling RPM J3 during the warm state of the engine on the broken line E on which the engine output is the same as that of P1 of FIG. 3 is assumed. In this case as well, the operation point P3 is away from the hatched portion of FIG. 3 as the operation area having excellent fuel efficiency and the fuel consumption optimum line A as compared with the operation point P1. In the embodiment, by performing the target Pe keeping control at the RPM J1 lower than the normal idling RPMs J2 and J3, it is possible to improve the fuel consumption performance. Note that the operation at the operation point P1 is on the fuel consumption optimum line A, and the retard angle control or the like is not performed.

In the flowchart of FIG. 2, in the case where a pre-set preferential auxiliary equipment request is during the execution of the processing from S22 to S26, the preferential auxiliary equipment request may be satisfied by canceling the execution of the catalyst warm-up target Pe keeping control to increase the engine RPM and increasing the engine output Pe for driving the first MG 22. "The preferential auxiliary equipment request" may be that an operation unit is instructed by a user to request a temperature change of not less than a pre-set specific temperature change in an air conditioner.

In the embodiment described above, although the case where each of the motor and the generator is the MG that has the functions of both of the motor and the generator has been described, the case is shown by way of example and the motor and the generator used in various models of the hybrid vehicle can be used as described below.

Figure 4:
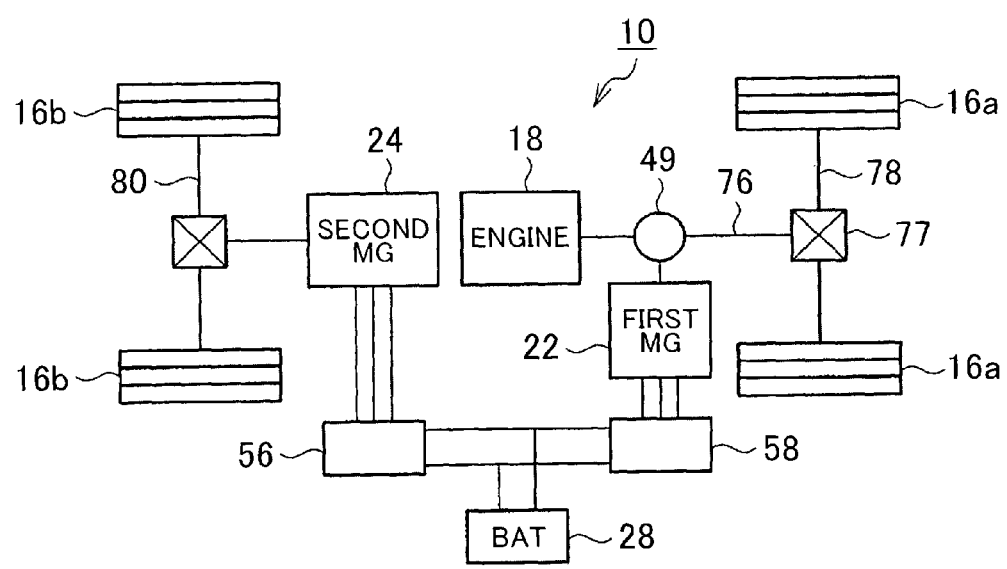
FIG. 4 is a configuration diagram showing a first example of the hybrid vehicle to which the embodiment of the invention can be applied.

FIG. 4 shows the configuration of a first example as another example of the hybrid vehicle 10 to which the embodiment of the invention can be applied. The hybrid vehicle 10 of FIG. 4 is configured such that power of an output shaft 76 coupled to the ring gear of the power dividing mechanism 49 is outputted to an axle 78 coupled to wheels 16a via a differential mechanism 77, and power of the second MG 24 is outputted to an axle 80 different from the axle 78. The axle 80 is coupled to other wheels 16b.

Figure 5:
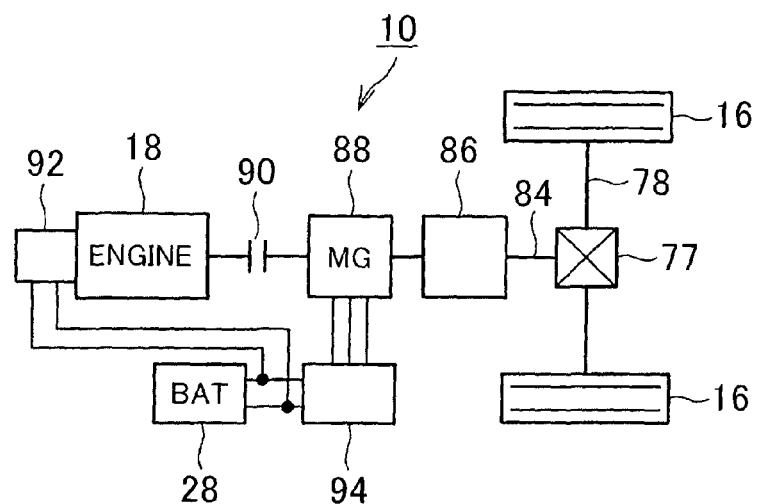
FIG. 5 is a configuration diagram showing a second example of the hybrid vehicle to which the embodiment of the invention can be applied.

FIG. 5 shows the configuration of a second example as another example of of the hybrid vehicle 10 to which the embodiment of the invention can be applied. In the hybrid vehicle 10 of FIG. 5, an output shaft of a transmission 86 is connected to a drive shaft 84 coupled to the wheels 16 via the differential mechanism 77, and a MG 88 is connected to an input shaft of the transmission 86. The engine 18 is connected to a rotating shaft of the MG 88 via a clutch 90. A generator 92 is connected to the engine 18, and the generator 92 is driven by the engine 18 to generate electric power. Power from the engine 18 is outputted to the drive shaft 84 via the rotating shaft of the MG 88 and the transmission 86, and power froth the MG 88 is outputted to the drive shaft 84 via the transmission 86. The MG 88 is connected to the battery 28 via an inverter 94.

Figure 6:
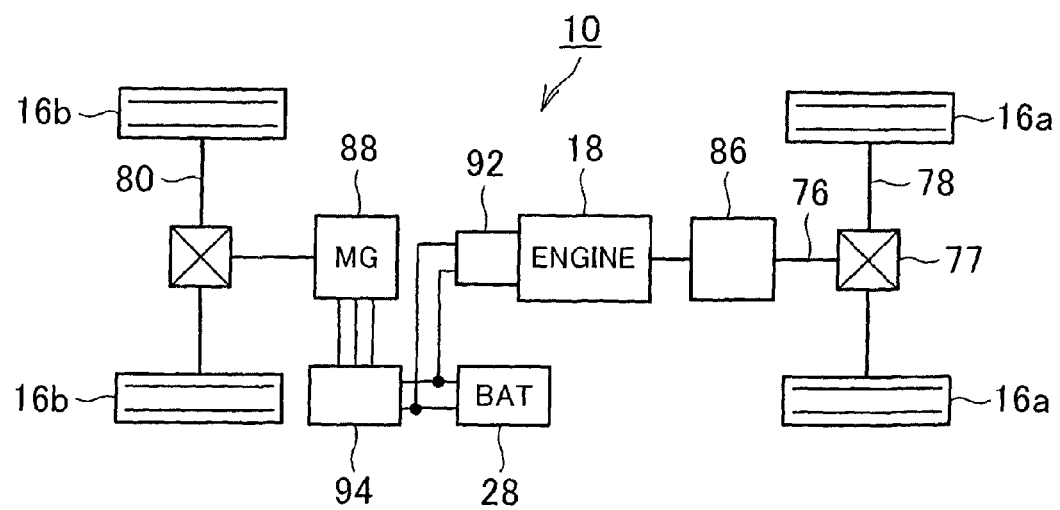
FIG. 6 is a configuration diagram showing a third example of the hybrid vehicle to which the embodiment of the invention can be applied.

FIG. 6 shows the configuration of a third example as another example of the hybrid vehicle 10 to which the embodiment of the invention can be applied. The hybrid vehicle 10 of FIG. 6 is configured such that the power from the engine 18 is outputted to the axle 78 coupled to the wheels 16a via the transmission 86, and the power from the MG 88 is outputted to the axle 80 different from the axle 78. The axle 80 is coupled to the wheels 16b. The generator 92 is connected to the engine 18, and is driven by the engine 18 to generate electric power. In the configuration of each of FIGS. 5 and 6, as the MG, a MG having the function of a simple electric motor may be used. While the configuration of each of FIGS. 1 and 4 is what is called two-motor type, the configuration of each of FIGS. 5 and 6 is what is called one-motor type. In each configuration of FIGS. 4 to 6, other configurations and operations are the same as those of each configuration of FIGS. 1 to 3.

Figure 7A:
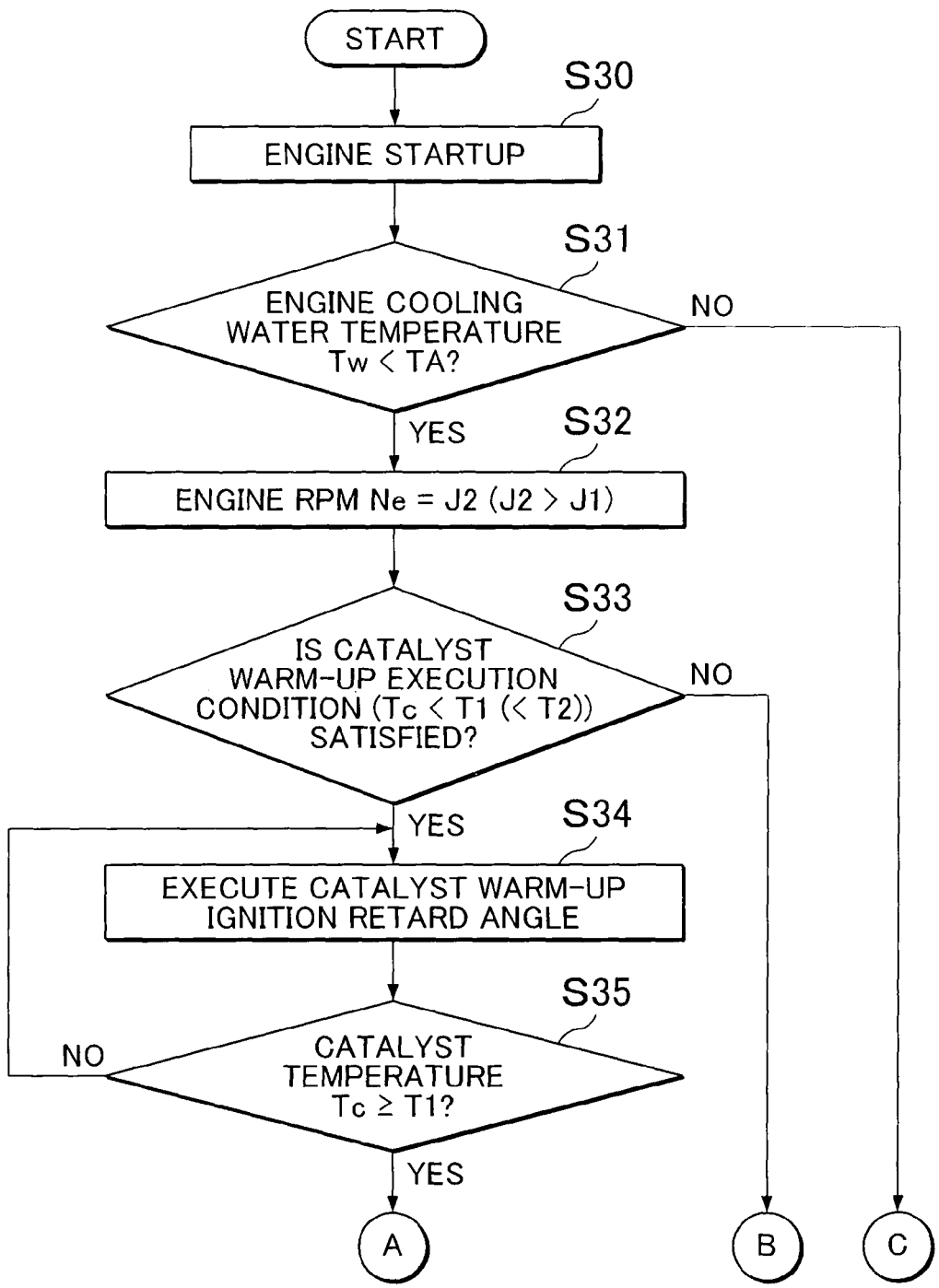
FIG. 7 is a flowchart showing a warm-up control method that performs the warm-up of the catalyst and the engine in a control system of another example of the embodiment of the invention.
Figure 7B:
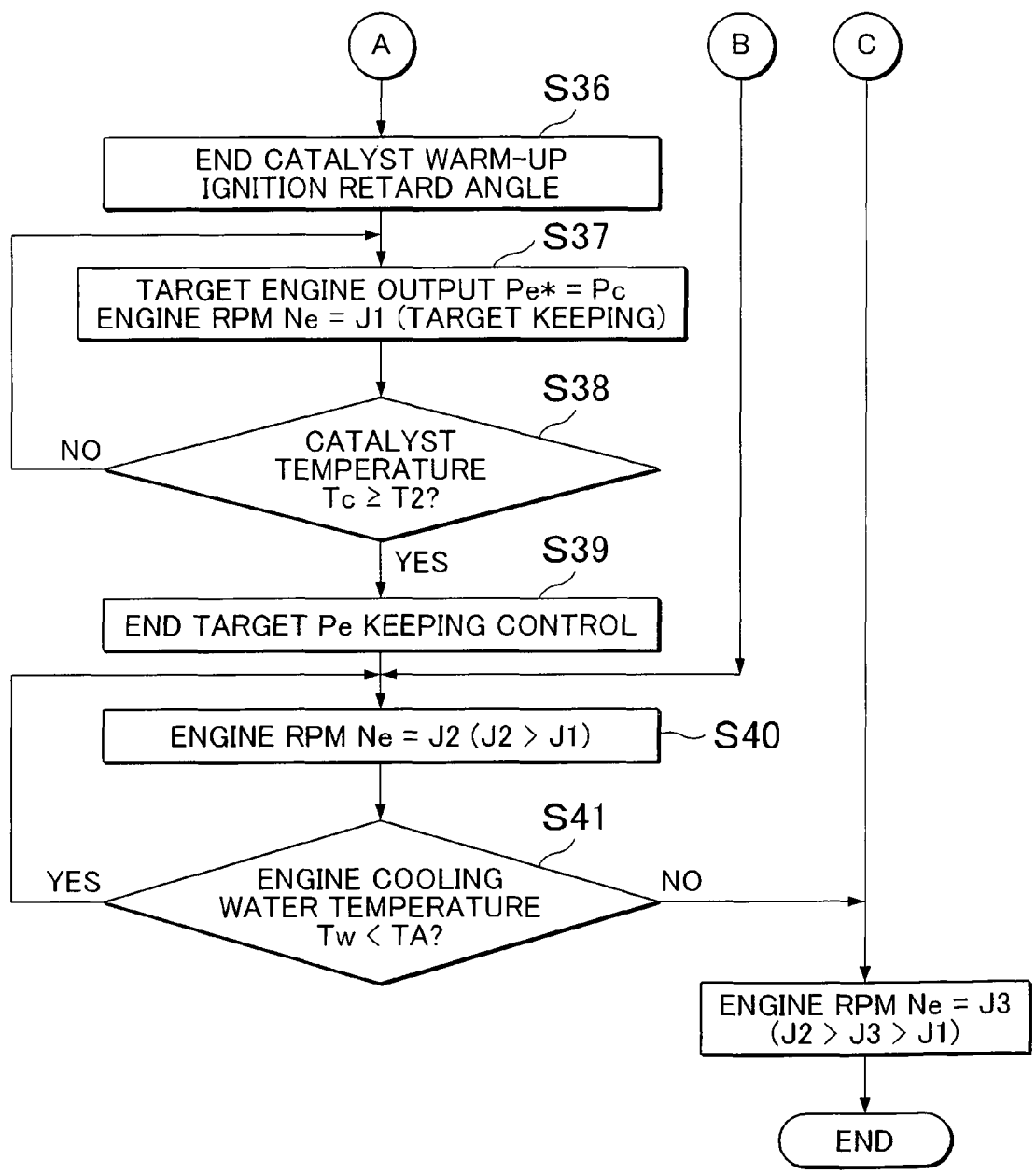

Next, with reference to FIG. 7 and FIGS. 8A to 8E, a detailed description will be given of the operation of the warm-up operation that has been described with reference to FIG. 2. Note that the flowchart of FIG. 7 is basically the same as the flowchart of FIG. 2, and the flowchart of FIG. 7 describes the RPM of the engine more clearly, and also clearly describes that the initial catalyst warm-up control is performed in the case where the catalyst temperature Tc is less than T1, the target Pe keeping control is performed in the case where the catalyst temperature Tc is not less than the first specific temperature T1 and less than the second specific temperature T2, the engine warm-up control is performed until the engine cooling water temperature Tw becomes equal to the specific temperature TA in the case where the catalyst temperature is not less than the second specific temperature T2, and the normal engine control is performed thereafter. FIGS. 8A to 8E show temporal changes in engine RPM Ne, engine output Pe, catalyst temperature Tc, engine cooling water temperature Tw, and ignition angle when the startup of the engine and the catalyst warm-up are performed in the case where the operations according to the flowchart of FIG. 7 are performed.

When the start switch or the ignition key (not shown) is turned ON by the user, the vehicle control unit 70 outputs the start command of the engine 18 and starts the engine 18 as indicated in S30 of FIG. 7 (time $t_1$ of each of FIGS. 8A to 8E). Next, as indicated in S31 of FIG. 7, the vehicle control unit 70 determines whether or not the engine cooling water temperature Tw is less than the specific temperature TA. Herein, in the case where the engine cooling water temperature Tw is less than the specific temperature, the vehicle control unit 70 determines that the warm-up of the engine 18 is necessary, and sets the RPM of the engine 18 to the second engine RPM J2 as the idling RPM during the cold state of the engine. With this, at time $t_1$ shown in FIG. 8A after the startup of the engine, the RPM of the engine 18 is increased to the second engine RPM J2. In addition, in the case where the engine cooling water temperature Tw is not less than the specific temperature TA in S31 of FIG. 7, the vehicle control unit 70 determines that the engine 18 is warmed and the warm-up thereof is not necessary, the processing moves to S42 of FIG. 7, and the vehicle control unit 70 sets the lower limit RPM of the engine 18 to the third engine RPM J3 as the idling RPM during the warm state of the engine. Herein, the second engine RPM, J2 is higher than the third engine RPM J3. In the case where the engine 18 is operated at the idling RPM J2 during the cold state of the engine or the idling RPM J3 during the warm state of the engine, the output Pe of the engine 18 has the value Pa that is significantly low as compared with the output Pc during the target Pe keeping control, or is substantially zero.

Next, as indicated in S33 of FIG. 7, the vehicle control unit 70 determines whether or not the catalyst temperature Tc is less than the first specific temperature T1. Subsequently, in the case where the catalyst temperature Tc is less than the first specific temperature, the vehicle control unit 70 determines that the catalyst warm-up is necessary, and, similarly to S16 of FIG. 2, the vehicle control unit 70 executes the ignition retard angle of the engine 18 to perform the initial catalyst warm-up control as shown from time $t_1$ to a time $t_2$ of FIG. 8E while holding the engine RPM at the second engine RPM J2 at the time of the startup and keeping the output Pe at Pa as shown from time $t_1$ to time $t_2$ of FIGS. 8A and 8B (S34 of FIG. 7). By this initial catalyst warm-up control, as shown from time $t_1$ to time $t_2$ of FIG. 8C, the catalyst temperature Tc is increased. As indicated in S35 of FIG. 7, the vehicle control unit 70 determines whether or not the catalyst temperature Tc has reached the first specific temperature T1 and, in the case where the catalyst temperature Tc is less than the first specific temperature T1, the processing returns to S34 of FIG. 7, and the vehicle control unit 70 continues the ignition retard angle control while holding the engine RPM at the second engine RPM J2 at the time of the startup.

Figure 8E:
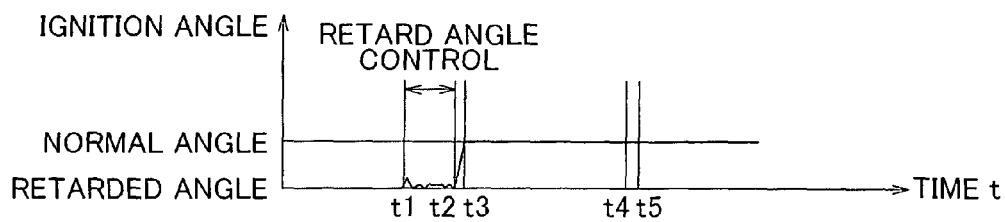
FIG. 8E is a graph showing a change in ignition angle in the control system of the other example of the embodiment of the invention.
Figure 8D:
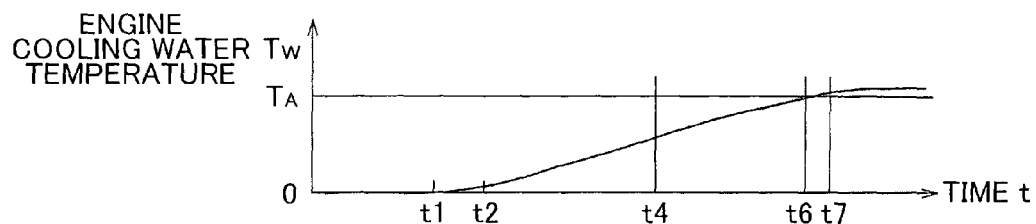
FIG. 8D is a graph showing a change in engine cooling water temperature in the control system of the other example of the embodiment of the invention.
Figure 8C:
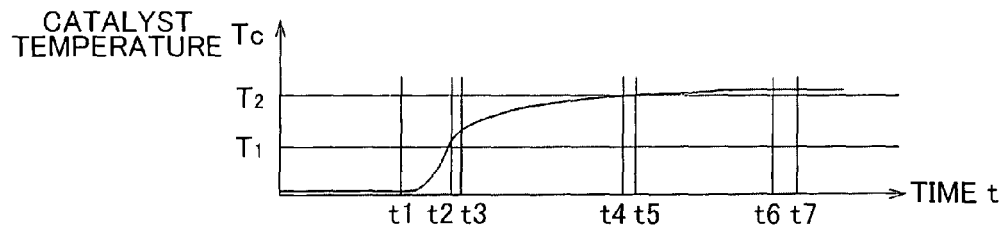
FIG. 8C is a graph showing a change in catalyst temperature in the control system of the other example of the embodiment of the invention.
Figure 8B:
FIG. 8B is a graph showing a change in engine output in the control system of the other example of the embodiment of the invention.
Figure 8A:
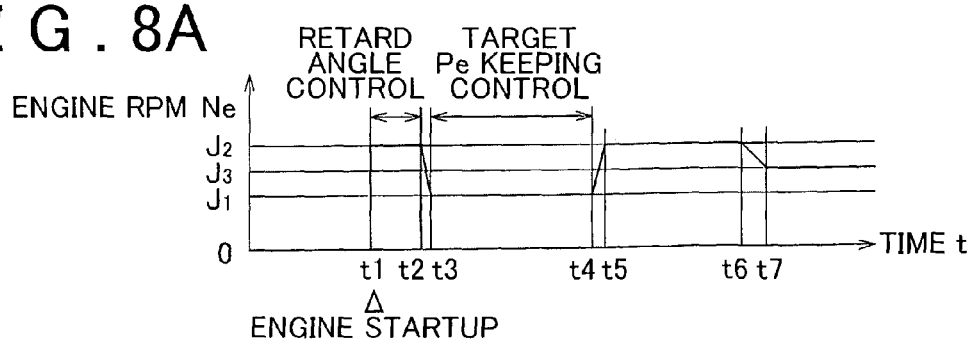
FIG. 8A is a graph showing a change in engine RPM in the control system of the other example of the embodiment of the invention.

When the catalyst temperature Tc is increased to the first specific temperature T1 at time $t_2$ of FIG. 8C, as indicated in S36 of FIG. 7 and shown from time $t_2$ to time $t_3$ of FIG. 8E, the vehicle control unit 70 ends the initial catalyst warm-up control using the ignition retard angle control of the engine 18, and sets the ignition angle of the engine 18 back to the normal angle. Subsequently, as indicated in S37 of FIG. 7, the vehicle control unit 70 executes the target Pe keeping control for the catalyst warm-up similarly to S24 and S26 of FIG. 2. As shown from time $t_2$ to time $t_3$ of FIGS. 8A and 8B, the vehicle control unit 70 increases the target engine output Pe* from Pa to the predetermined target output Pc, and reduces the engine RPM Ne from the second engine RPM J2 as the idling RPM during the cold state of the engine used at the time of the startup of the engine to the first engine RPM J1. With this, the operation point of the engine 18 becomes the point P1 on the fuel consumption optimum line A shown in FIG. 3.

The vehicle control unit 70 monitors whether or not the catalyst temperature Tc becomes not less than the second specific temperature T2 as indicated in S38 of FIG. 7 while performing the target Pe keeping control in which the RPM of the engine 18 is the first engine RPM J1 and the engine output is predetermined target Pc. During this period, electric power is generated by the first MG 22 using the output Pc of the engine 18, and the generated electric power is used to charge the battery 28. Subsequently, when the catalyst temperature Tc becomes not less than the second specific temperature T2 at time $t_4$ of FIG. 8C, as indicated in S39 of FIG. 7, the vehicle control unit 70 determines that the catalyst warm-up is completed, and ends the target Pe keeping control for the catalyst warm-up. Then, as indicated in S40 of FIG. 7 and shown from time $t_4$ to time $t_5$ of FIGS. 8A and 8B, the vehicle control unit 70 increases the RPM of the engine 18 to the second engine RPM J2 as the initial idling RPM during the cold state of the engine, and reduces the output of the engine 18 to substantially zero from Pc to perform idling and continue the warm-up of the engine 18. Subsequently, as indicated in S41 of FIG. 7, when the engine cooling water temperature Tw becomes not less than the specific temperature TA, the vehicle control unit 70 reduces the RPM of the engine 18 to the idling RPM J3 during the warm state of the engine (J3 is the RPM higher than J1) as indicated in S42 of FIG. 7 and shown from time $t_6$ to time $t_7$ of FIG. 8A, and operates the engine 18 in a normal idling state. After time $t_7$, the engine output is controlled according to the target engine output Pe calculated based on the detected value of the accelerator position AP or the detected values of the vehicle speed and the accelerator position AP. In this case, the engine RPM is not less than the idling RPM J3 during the warm state of the engine. Note that, after the end of the catalyst warm-up control, in the engine warm-up control performed from time $t_5$ to time $t_7$, the target engine output Pe may be calculated based on the detected value of the accelerator position AP or the detected values of the vehicle speed and the accelerator position AP, and the engine output may be increased from substantially zero according to the calculated value. In this case, the engine RPM is higher than the idling RPM J2 during the cold state of the engine.

As described thus far, in the embodiment, in the target Pe keeping control for the catalyst warm-up from time $t_3$ to time $t_4$ shown in FIGS. 8A to 8E, it is possible to improve the fuel consumption while maintaining the stable operation by using the predetermined target output (predetermined target Pc) of the engine 18, and predetermined target using, as the RPM Ne of the engine 18, the first engine RPM J1 that is lower than the idling RPM J2 during the cold state of the engine and the idling RPM J3 during the warm state of the engine.

In the embodiment described thus far, the description has been given on the assumption that, at the first startup, the engine cooling water temperature Tw is lower than the specific temperature TA and the engine 18 is started at the idling RPM J2 during the cold state of the engine. As long as the engine cooling water temperature Tw is lower than the specific temperature TA, the invention can be applied.

The embodiment of the invention has been described thus far. The invention is not limited to the above embodiment, and the invention can be carried out in various forms without departing from the gist thereof. For example, the control system of the hybrid vehicle of the invention can be applied to the hybrid vehicle that does not include the generator.

In addition, the catalyst temperature may be detected by using the catalyst temperature sensor as described above. The catalyst temperature may also be estimated as the estimated value by the following method. That is, "the catalyst temperature" may be estimated as the sum of "an initial catalyst temperature" and "a catalyst warm-up portion by engine operation". In this case, "the initial catalyst temperature" is estimated from the detected temperature of the engine cooling water detected by the water temperature sensor at the time of stop of the engine. In addition, "the catalyst warm-up portion by engine operation" is estimated from the detected values or the calculated values of the intake air amount and the ignition retard angle amount of the engine. For example, the catalyst temperature is increased in the case where the intake air amount is large, and the catalyst temperature is increased also in the case where the ignition retard angle amount is large, and hence it is possible to estimate the warm-up portion by the engine operation from the intake air amount and the ignition retard angle amount by using a pre-set relational expression.

The invention claimed is:

1. A hybrid vehicle comprising:
   an engine;
   a motor;
   a catalyst used to purify exhaust gas of the engine; and
   an electronic control unit configured to:
   (a) control the engine and the motor according to an output request of the hybrid vehicle;
   (b) execute a target engine output keeping control for controlling an engine output such that a target engine output keeps at a predetermined value during warm-up of the catalyst; and
   (c) set an engine speed to a first engine speed when the target engine output keeping control is executed, the first engine speed being lower than a lower limit engine speed at which the engine is operated without executing the target engine output keeping control.

2. The hybrid vehicle according to claim 1, wherein
   the electronic control unit executes an ignition retard angle control in which an ignition timing of the engine is retarded by a specific angle when a temperature of a cooling water of the engine is less than a first specific temperature and a temperature of the catalyst is less than a second specific temperature, and
   the electronic control unit executes the target engine output keeping control when the temperature of the catalyst is not less than the second specific temperature and not more than a third specific temperature, the third specific temperature being higher than the second specific temperature.

3. The hybrid vehicle according to claim 2, wherein
   the electronic control unit sets a lower limit engine speed when the engine is operated to a second engine speed, the second engine speed being higher than the first engine speed, when the temperature of the cooling water of the engine is less than the first specific temperature and the temperature of the catalyst is more than the third specific temperature.

4. The hybrid vehicle according to claim 3, wherein the second engine speed is an idling speed during a cold state of the engine.

5. A control method for a hybrid vehicle including an engine, a motor, an electronic control unit, and a catalyst used to purify exhaust gas of the engine, the control method comprising:
controlling, by the electronic control unit, the engine and the motor according to an output request of the hybrid vehicle;
executing, by the electronic control unit, a target engine output keeping control for controlling an engine output such that a target engine output keeps at a predetermined value during warm-up of the catalyst; and
setting, by the electronic control unit, an engine speed to a first engine speed when the target engine output keeping control is executed, the first engine speed being lower than a lower limit engine speed at which the engine is operated without executing the target engine output keeping control.

6. The control method according to claim 5, further comprising:
executing, by the electronic control unit, an ignition retard angle control in which an ignition timing of the engine is retarded by a specific angle when a temperature of a cooling water of the engine is less than a first specific temperature and a temperature of the catalyst is less than a second specific temperature; and
executing the target engine output keeping control by the electronic control unit when the temperature of the catalyst is not less than the second specific temperature and not more than a third specific temperature, the third specific temperature being higher than the second specific temperature.

* * * * *